(No Model.)
G. YOUNG.
TIRE FOR VEHICLE WHEELS.
No. 558,248. Patented Apr. 14, 1896.
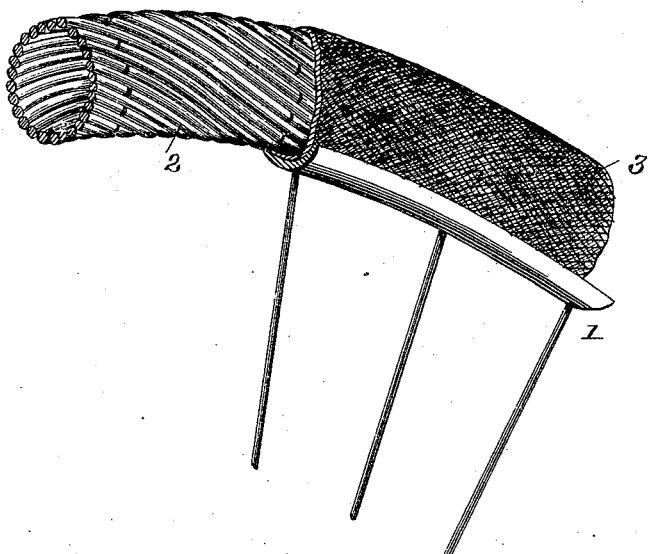
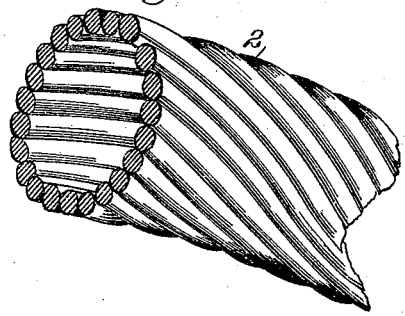
Witnesses
Inventor
George Young
By T. J. W. Robertson
Attorney

UNITED STATES PATENT OFFICE.

GEORGE YOUNG, OF ALMOND, NEW YORK.

TIRE FOR VEHICLE-WHEELS.

SPECIFICATION forming part of Letters Patent No. 558,248, dated April 14, 1896.

Application filed August 23, 1895. Serial No. 560,242. (No model.)

*To all whom it may concern:*

Be it known that I, GEORGE YOUNG, a citizen of the United States, residing at Almond, in the county of Allegany and State of New York, have invented a certain new and useful Improvement in Tires, of which the following is a specification, reference being had to the accompanying drawings.

This improvement is designed to provide a tire for vehicle-wheels which, while possessing great elasticity, will be entirely free from the danger of puncturing, as in pneumatic tires.

In the accompanying drawings, Figure 1 is a perspective view of part of a wheel provided with a tire constructed according to my improvement. Fig. 2 is a similar view of a section of a tire on a larger scale.

Referring now to the details of the drawings by figures, 1 represents the ordinary rim of a bicycle, carrying the tire, consisting of a series of wires 2, twisted or wound together in the form of a tube. Around this is a covering 3, preferably of woven fabric, which may be made, if preferred, of braided cord or rope.

Various styles of joining the ends of the tube to make it in the form of a tire may be employed; but I prefer to splice the ends by cutting out the alternate wires at each end and working the projecting wires of one end into the spaces between the projecting wires of the opposite ends. The spiral arrangement of the wires will hold the ends together, and the braided covering will also aid to keep the ends of the wires in position, although this is not absolutely necessary.

By this construction a very durable yet elastic tire may be provided, which will be very useful for many styles of vehicles as well as bicycles.

I am aware that it has been proposed to make a tire of a single wire wound spirally and covered with leather or rubber and that it has also been proposed to make a tire of braided wire, and therefore do not claim, broadly, a tubular metallic tire.

A braided tire has the disadvantage, when used without a covering, of leaving many openings between the wires, whereby the hollow space would soon become filled with dirt; but with the spiral wires arranged as shown little or no dirt could pass through, and such a spiral tire has therefore advantages which a braided wire does not possess.

What I claim as new is—

1. As an improved article of manufacture, a tire for wheels composed of a series of wires wound spirally in close order in the form of a tube, said wires running lengthwise around the tire and being disconnected from each other, whereby each wire yields independently of the others, substantially as described.

2. As an improved article of manufacture, a tire for wheels composed of a series of wires wound spirally in close order into a hollow tube with a portion of the wires of each end longer than the others so as to leave spaces between them and the long wires of one end of the tube set between the long ends of the other end, substantially as described.

3. A tubular wire tire formed with a series of wires wound spirally in close order into a tube, with the alternate wires of one end set in spaces formed between the wires of the opposite end, and a covering over said tire to help sustain such wires in position, substantially as described.

In testimony whereof I affix my signature, in the presence of two witnesses, this 17th day of August, 1895.

GEORGE YOUNG.

Witnesses:
T. J. W. ROBERTSON,
W. E. CLENDANIEL.